J. BLATZ.
CASH REGISTER.
APPLICATION FILED SEPT. 1, 1909.
984,416.
Patented Feb. 14, 1911.
3 SHEETS—SHEET 1.
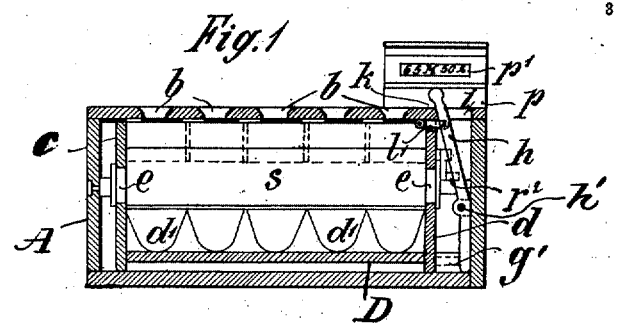
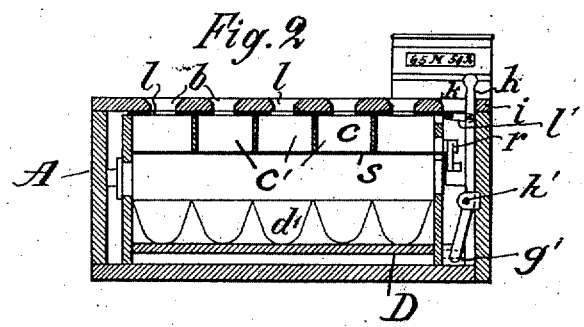
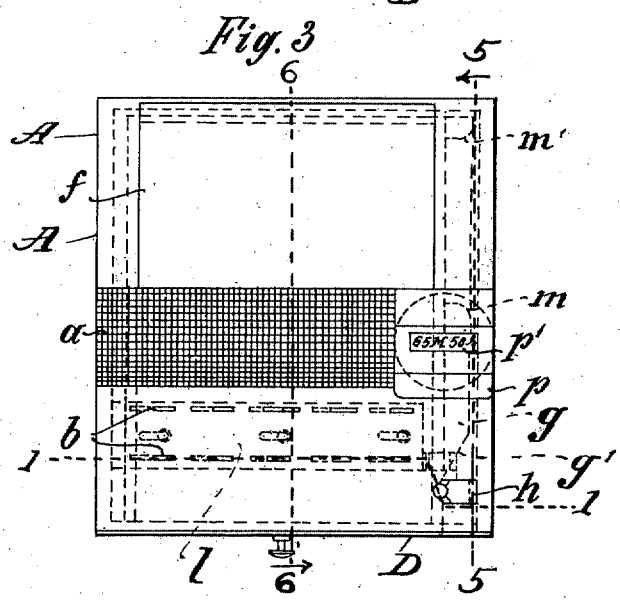
Witnesses:
Inventor:

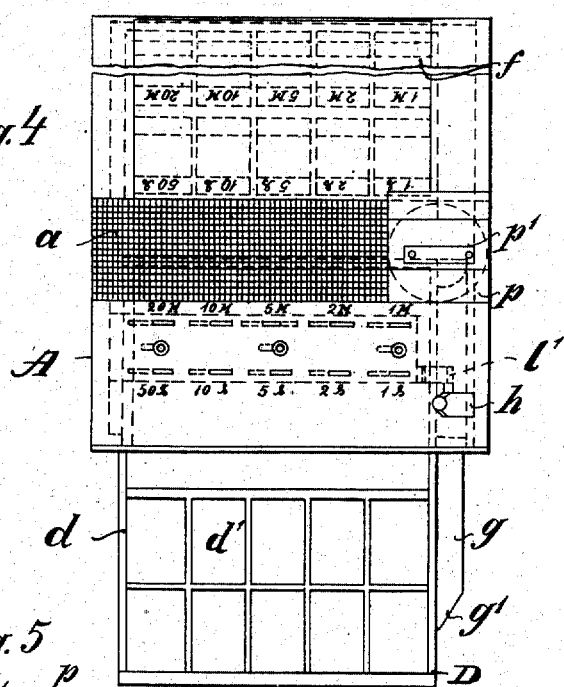

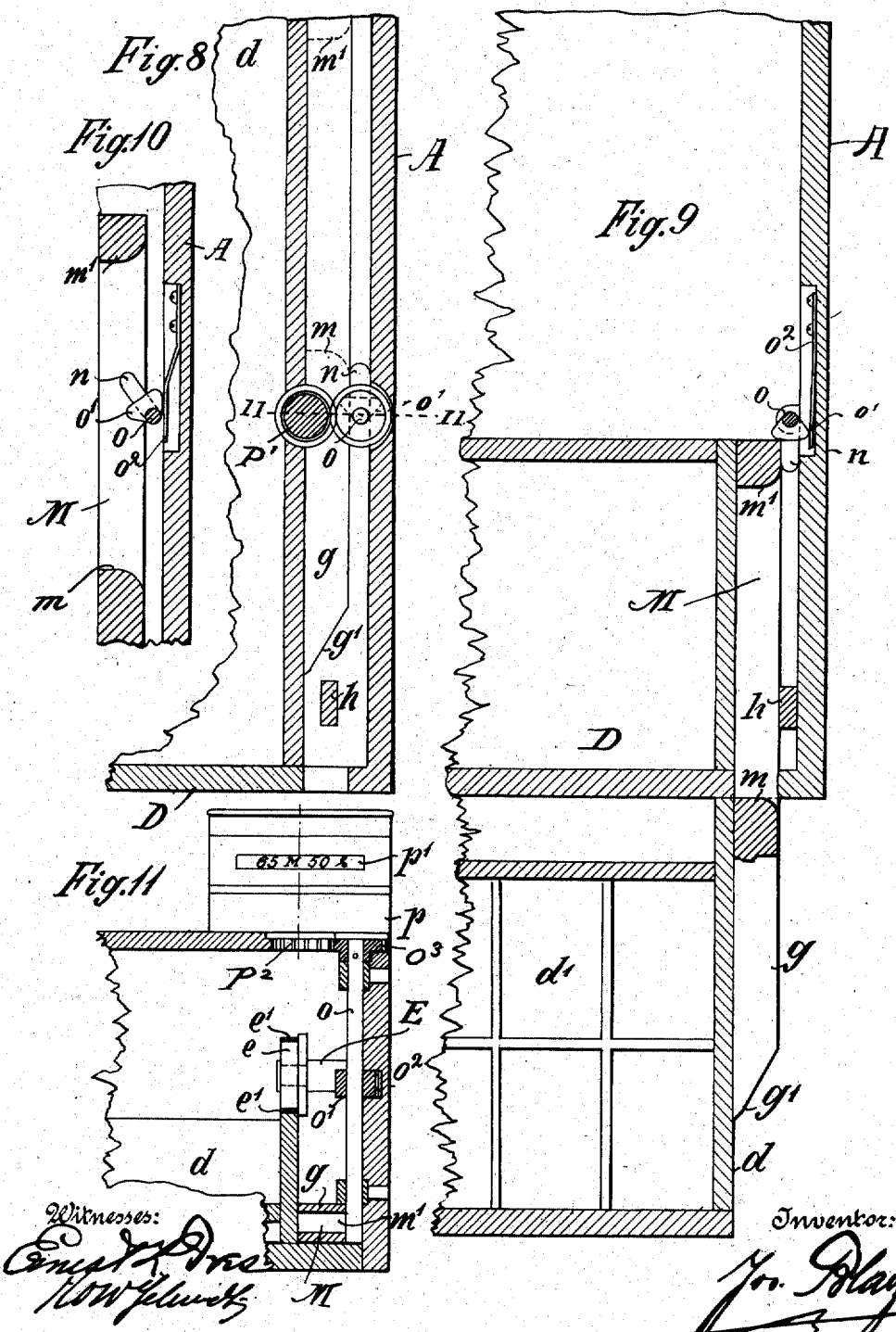

UNITED STATES PATENT OFFICE.

JOSEPH BLATZ, OF KARLSRUHE, GERMANY.

CASH-REGISTER.

984,416.  Specification of Letters Patent.  Patented Feb. 14, 1911.

Application filed September 1, 1909. Serial No. 515,696.

*To all whom it may concern:*

Be it known that I, JOSEPH BLATZ, a subject of the German Emperor, and resident of Karlsruhe i. B., Germany, have invented certain new and useful Improvements in Cash-Registers, showing to the purchaser both the registered payment and the cash tendered, dropping then the money into the till, of which the following is a specification.

This invention relates to improvements in cash tills for use by retail dealers and has for its object the provision of a till wherein the amount of the purchase is recorded by the salesman upon an autograph recorder, and wherein the purchase amount is disclosed to the purchaser during purchase and when change is made and returned.

A further object of the invention is to provide a cash till wherein the sum paid in by the purchaser to the seller is also disclosed to the purchaser before it is finally deposited into the cash drawer.

The main purpose and object of the invention is to fully disclose to the purchaser the amount of the cash purchase as recorded by the seller and also the fact that the cash offered to the seller is deposited in the till. This disclosure make it possible for the purchaser to determine the change due him and also prevents the seller from withholding any portion of the cash payment from the till.

The invention will be more fully described in connection with the accompanying drawings and will be more particularly pointed out in and by the appended claims.

In the drawings:—Figure 1 is a sectional view on line 1—1 of Fig. 3. Fig. 2 is a similar sectional view with parts shown in a different position. Fig. 3 is a plan view of a cash till embodying the main features of my invention. Fig. 4 is a view similar to Fig. 3 with the cash drawer opened. Fig. 5 is sectional view on line 5—5 of Fig. 3. Fig. 6 is a sectional view on line 6—6 of Fig. 3. Fig. 7 is a sectional view on line 7—7 of Fig. 6. Fig. 8 is a sectional view on line 8—8 of Fig. 5 showing one side of the till. Fig. 9 is a sectional view on line 9—9 of Fig. 5 showing one side of the till. Fig. 10 is a sectional view similar to Fig. 9 showing the cash drawer partially opened. Fig. 11 is a sectional view on line 11—11 of Fig. 8.

Like characters of reference designate similar parts throughout the different figures of the drawings.

As shown A designates the outer casing of the till which is provided with a cash receiving surface $a$ on which the purchase cash is deposited by the purchaser. At one side of the cash receiving portion a plurality of slots $b$ is provided and said slots are of different sizes to accommodate coins of different denominations. At the other side of the cash receiving portion $a$ the till casing is provided with a transparent portion $f$.

An autograph recorder $p$ of any of the well known type, is disposed on the till casing A as shown in Fig. 3. The autograph recorder $p$ is provided with an opening $p'$ through which the seller inscribes the amount of the purchase upon a tape in the usual manner. For actuating the recorder $p$ a gear pinion $p^2$ is provided which meshes with a pinion $o^3$, the operation of which will hereinafter more fully appear.

A cash drawer is designated as a whole at D and in its forward portion $d$ is divided into a plurality of separate sorting compartments $d'$ in order to retain the coin of different denominations separate after such coin has been sorted.

A show till is indicated as a whole at $c$ and comprises a receptacle divided into compartments $c'$ for receiving coin of different denominations. This show till is designed to be moved into a receiving position with respect to the coin slots $b$ and into an exposing position with respect to the transparent portion $f$ and is arranged to deliver the coin received therein to the cash drawer D. As shown two rows of coin slots $b$ are provided and accordingly the show till $c$ is provided with two rows of compartments $c'$ arranged to register with the rows of slots $b$ as shown in Fig. 6. The cash drawer D is provided with two rows of compartments $d'$ so arranged that when the drawer is closed the forward and rearward rows $d'$ will register with the forward and rearward rows of the cash till and coin slots. The rows of compartments $c'$ of the show till are provided with openable bottom portions $s$ to provide for delivery of the coin from the show till to the cash drawer. The bottom walls $s$, as shown in Fig. 7, are hinged upon rods $t'$, mounted in the show till, and springs $t$ are provided for normally holding the bottom portions s closed or in an upward position. Means is provided for moving said show till from a receiving position beneath the slots b to an exposing position beneath the transparent portion f by the opening and closing of the drawer D. Devices are also provided for automatically actuating the bottom portions s to discharge the coin in the show till into the drawer when the parts are in the position shown in Fig. 6.

In the construction illustrated pulleys e are mounted upon studs E projecting from the casing A, as shown in Fig. 11. Belts e' are trained about the pulleys e and the show till c is connected with the belts at z and the belts are connected with the cash drawer at y, as shown in Figs. 5 and 6. When the cash drawer D is in a closed position as shown in Fig. 6 the show till c is beneath the coin slots b. From this figure it will be obvious that when the bottom portions s are open the coins in the forward and rearward rows of compartments c' of the show till c will be discharged into the forward and rearward compartments d' of the cash drawer D. It will also be observed from Figs. 1 and 2 that the compartments c' of the show till c are in vertical alinement with the compartments d' of the cash drawer D.

Next referring to the devices for automatically opening the bottom portions s, the same include, a bell crank r pivotally mounted on the show till c and provided on one of its arms with a roller r' and on its other arm with a roller $r^2$. As will be seen by reference to Fig. 6, the roller r' is disposed beneath the inner ends of the bottom walls s so that when said roller is lifted, as shown in Fig. 6, the outer ends of the walls s will be depressed or lowered. The roller $r^2$ is actuated by an element which as shown is in the form of a lever h, pivoted at h', to the casing A, as shown in Figs. 1 and 2. The upper portion of said lever h is adapted, when swung into the position shown in Fig. 1, to lie in the path of the roller $r^2$ and cause the bell crank r to move from the position shown at the right of Fig. 6 to that shown in the left thereof. The lever h is actuated by the drawer D and as shown the same has a cam g provided with a chamfered cam surface g'. The cam or actuating member g is mounted on the side of the drawer D in a manner to engage the lower end of the lever h, as clearly shown in Figs. 1 and 2. The lever h projects upwardly through the casing A and is conveniently utilized as an actuating member for a slide l for closing and opening the coin slots b. The slide l is provided with slots adapted, in one position of the slide to register with the slots b, and, in another position to close the slots b. The slide l is connected with the lever h by a link l' as shown in Figs. 1 and 2. When the lever h is in the position shown in Fig. 1 the coin slots b are closed and so also is the cash drawer D. When a purchase is to be made and the purchaser deposits the cash upon the receiving portion a the seller will first move the lever h from the position k to the position i as shown in Fig. 2. This will open the coin slot and enable the seller to deposit the coin therethrough into the show till c. After the lever h has been moved to the position shown in Fig. 2. The lower end of the lever will lie in front of the chamfered cam portion g' and when the drawer D is withdrawn the lever h will be actuated and moved from the position i to the position k thereby closing the slot b. When the drawer D is returned to the position shown in Fig. 3 the slots b will still remain closed until the lever h is actuated by the seller.

The autograph recorder p is operated by the following mechanism: A shaft o is suitably journaled at one side of the casing A as shown in Fig. 11. A cam o' is mounted on the shaft o and is adapted to be engaged by spring $o^2$ mounted in a recessed portion in the side of the casing A as shown in Figs. 10 and 11. Near the lower ends of the shaft o a finger n is mounted and is arranged to project into an opening preferably formed in the rear of the actuating cam g. The opening is indicated at M and is provided with cam actuating portions m and m'. when the cash drawer D is in the position shown in Fig. 8 the actuating member m lies rearwardly of the finger n. When the drawer D is partially withdrawn, as shown in Fig. 10, the opening M is abreast of the finger n and the latter is free to project therein under the action of spring $o^2$. Upon further outward movement of the drawer D the cam actuating portion m' engages the end of the finger n and turns the same into the position shown in Fig. 9 wherein the finger n lies between the actuating cam portion m' and the wall of the casing A. From the position shown in Fig. 8 to the position shown in Fig. 9 the shaft o will have been turned 180° and this will result in operation of the autograph recorder through the gears $o^3$ and $p^2$. Upon return movement of the drawer D to the position shown in Fig. 8 the cam actuating portion m' will release the finger n and the spring $o^2$ will swing the finger n into the opening M and when the cam actuating portion m engages the finger it will return the same to the position shown in Fig. 8.

I claim:—

1. A cash till comprising in combination, a casing provided with coin slots, a coin receiving portion and a coin exposing portion, a cash drawer slidable in said casing, a reciprocable show till movable beneath said slots and exposing portion and arranged to deliver to said drawer, and means actuated by said drawer for moving said till out of an exposing position with respect to said exposing portion, and beneath said slots and away from receiving proximity of said slots to an exposing position abreast of said portion.

2. A cash till comprising in combination, a casing provided with coin slots, a cash drawer slidable in said casing, a reciprocable show till movable beneath said slots and exposing portion and arranged to deliver to said drawer, and means actuated by said drawer for moving said till out of an exposing position with respect to said portion and beneath said slot and away from receiving proximity of said slots to an exposing position abreast of said portion.

3. A cash till comprising in combination, a casing provided with coin slots in one portion and having a coin exposing portion at a remote point from said slot, a cash drawer slidable in said casing, a reciprocable show till movable beneath said slots and exposing portion and arranged to deliver to said drawer, and means actuated by movement of said drawer for moving said till from a point abreast of said slot to a point abreast of said exposing portion and vice versa.

4. A cash till comprising in combination, a casing provided with coin slots at one end thereof and a coin exposing portion at the other point thereof, a cash drawer slidable in said casing, a reciprocable show till movable beneath said slots and exposing portion and arranged to deliver to said drawer, and means actuated by movement of said drawer for moving said till abreast of said slots and exposing portion.

5. A cash till comprising in combination, a casing provided with coin slots and a coin exposing portion, a cash drawer slidable to and fro in said casing, a show till movable beneath said slots and exposing portions and provided with openable wall portions, means actuated by said drawer for moving said till abreast of said slots and coin exposing portion, and a device for opening the wall portions of said till to deliver the coin therein to said drawer.

6. A cash till comprising in combination, a casing provided with coin slots and a coin exposing portion, a cash drawer slidable in said casing, a show till movable beneath said slots and exposing portions and provided with wall portions adapted to deliver the coin therein to said drawer, means actuated by a movement of the drawer for moving said till abreast of said slots and exposing portions, and a device actuated by said drawer for opening said wall portions when said till is in a position to deliver to said drawer.

7. A cash till comprising in combination, a casing provided with coin slots and a coin exposing portion, a cash drawer slidable in said casing, a show till movable beneath said slots and exposing portions and provided with bottom wall portions arranged to deliver coin to said drawer, a device carried by said show till for opening said bottom wall portions, means actuated by movement of said drawer for moving said till abreast of said slots and exposing portions, and an element actuated by said drawer for operating said device to open said bottom portions and deliver the coin in said till to said drawer.

8. A cash till comprising in combination, a casing provided with coin slots and a coin exposing portion, a device for opening and closing said slots, a cash drawer slidable in said casing, a show till movable beneath said slots and exposing portion and arranged to deliver to said drawer, means actuated by the movement of said drawer for moving said till abreast of said slots and said exposing portion, and means actuated by movement of said drawer for operating said slot closing device.

9. A cash till comprising in combination, a casing provided with coin slots and a coin exposing portion, a cash drawer slidable in said casing, a show till movable beneath said slots and exposing portion and arranged to deliver to said drawer, a slide for closing said coin slots, said till having elements for releasing the coin therein and delivering to said drawer, means operated by movement of said drawer for moving said till abreast of said slots and exposing portion, means operated by said drawer for moving said slide, said last mentioned means serving to operate said elements to release the coin in said till and deliver the same to said drawer.

10. A cash till comprising in combination, a casing provided with coin slots and a coin exposing portion, a cash drawer slidable in said casing, a show till movable beneath said slots and exposing portion and having elements for releasing the coin therein to deliver the same to said drawer, means actuated by movement of said drawer for moving said till abreast of said slots and exposing portion, a slide for opening and closing said coin slots, and a member operated by said drawer for actuating said slide and said elements.

11. A cash till comprising in combination, a casing provided with coin slots, and a coin exposing portion, a cash drawer slidable in said casing, a show till movable beneath said slots and exposing portion and having elements arranged to release the coin therein and deliver the same to said drawer, a slide for opening and closing said coin slots, a device for operating said elements, a member actuated by said drawer for operating said slide and said device, and means operated by movement of said drawer for moving said till abreast of said slot and exposing portion.

12. A cash till comprising in combination, a casing, a cash drawer slidable therein, and a manual recorder actuating device for said casing, said drawer having oppositely acting portions for operating said device.

13. A cash till comprising in combination, a casing provided with coin slots and a coin exposing portion, a cash drawer slidable in said casing, a show till movable beneath said slots and exposing portion and arranged to deliver to said drawer, means actuated by movement of said drawer for moving said till abreast of said slots and said exposing portion, and recorder actuating means comprising a shaft, a cam on said shaft, a spring engaging said shaft to normally thrust the same in one direction, a finger on said shaft, said drawer having cam portions arranged to engage said finger to operate said shaft.

14. A cash till comprising in combination, a casing provided with a coin receiving portion and coin slots on one side thereof and a coin exposing portion on the other side of said receiving portion, a cash drawer slidable in said casing, a reciprocable show till movable beneath said slots and exposing portion and arranged to deliver to said drawer, and means actuated by movement of said drawer for moving said till abreast of said slots and exposing portion.

15. A cash till comprising in combination, a casing provided with coin slots and a coin exposing portion, a cash drawer slidable in said casing, a reciprocable show till movable beneath said slots and exposing portion and provided with mechanism causing the start of the coin from said till to said drawers, means actuated by movement of said drawer for moving said till abreast of said slots and exposing portion, and means actuated by said drawer for operating said mechanism, substantially as and for the purpose set forth.

16. A cash till comprising in combination, a casing provided with coin slots, a cash drawer slidable in said casing, a reciprocable show till movable beneath said slots and away therefrom and provided with mechanism causing the start of the coin from said till to said drawer, means actuated by movement of said drawer for moving said till abreast of said slots and away therefrom, and means actuated by said drawer for operating said mechanism, substantially as and for the purpose set forth.

17. A cash till comprising in combination, a casing provided with groups of coin slots, a cash drawer in said casing, a reciprocable show till movable beneath said slots and away therefrom and provided with groups of compartments proportioned to register with said slots when said till is in one position, and means actuated by said drawer for moving said till abreast of said slots and away therefrom.

18. A cash till comprising in combination, a casing provided with groups of coin slots, a cash drawer slidable in said casing and provided with groups of compartments, a reciprocable show till movable beneath said slots and away therefrom and arranged to deliver to said drawer and provided with groups of compartments proportioned to register with said slots and arranged to deliver to proper compartments in said drawer, and means actuated by movement of said drawer for moving said till abreast of said slots and away therefrom.

19. A cash till comprising in combination, a casing provided with groups of coin slots for coin of different denominations, a cash drawer slidable in said casing and provided with groups of compartments for coins of different denominations, a reciprocable show till movable beneath said slots and away therefrom and provided with compartments for coin of different denominations adapted when the till is in one position to register with slots of corresponding denominations and to deliver to compartments in said drawer of corresponding denominations, and means actuated by movement of said drawer for moving said till abreast of said slots and away therefrom.

20. A cash till comprising in combination, a casing provided with coin slots, a device for opening and closing said slots, a cash drawer slidable in said casing, a reciprocable show till movable beneath said slots and away therefrom and arranged to deliver to said drawer, means actuated by movement of said drawer for moving said till abreast of said slots and away therefrom, and means actuated by said drawer for operating said device to close and open said slots.

21. A cash till comprising in combination, a casing provided with coin slots, a cash drawer slidable in said casing and provided with groups of compartments for coin of different denominations, a reciprocable show till movable beneath said slots and away therefrom and provided with compartments for coin of different denominations adapted to register with corresponding compartments in said drawer and arranged to deliver to said drawer, and means actuated by movement of said drawer for moving said till abreast of said slots and away therefrom and into a position to discharge the said drawer.

22. A cash till comprising in combination, a casing provided with coin slots, a cash drawer slidable in said casing, a device for closing and opening said slots arranged to be independently operated, and means actuated by movement of said drawer for operating said device.

23. A cash till comprising in combination, a casing provided with coin slots, a cash drawer slidable to and from said casing, a reciprocable show till movable beneath said slots and away therefrom and provided with a device for discharging the contents of said till into said drawer, means actuated by said drawer for moving said till abreast of said slots and into a discharging position, and mechanism for operating said device to discharge the coins from said till into said drawer.

24. A cash till comprising in combination, a casing provided with coin slots, a cash drawer slidable to and from said casing, a reciprocable show till movable beneath said slots and away therefrom and provided with a device for discharging the contents of said till into said drawer, means actuated by said drawer for moving said till abreast of said slots and into a discharging position, and mechanism actuated by said drawer for operating said device to discharge the coin from said till into said drawer.

25. A cash till comprising in combination, a casing, a cash drawer slidable in said casing, and a manual recorder actuating means comprising a shaft, a cam on said shaft, a spring engaging said shaft to normally press the same in one direction, a finger on said shaft, said drawer having cam portions arranged to engage said finger to operate said shaft.

26. A cash till comprising in combination, a casing, a cash drawer slidable in said casing, and a recorder actuating means comprising an oscillating shaft, said drawer having cam portions arranged to oscillate said shaft upon reciprocation of said drawer.

In testimony whereof I have signed my name to this specification in the presence of two subscribing witnesses.

JOSEPH BLATZ.

Witnesses:
ERNEST L. IVES,
W. W. SCHMIDT.